Figure 1:
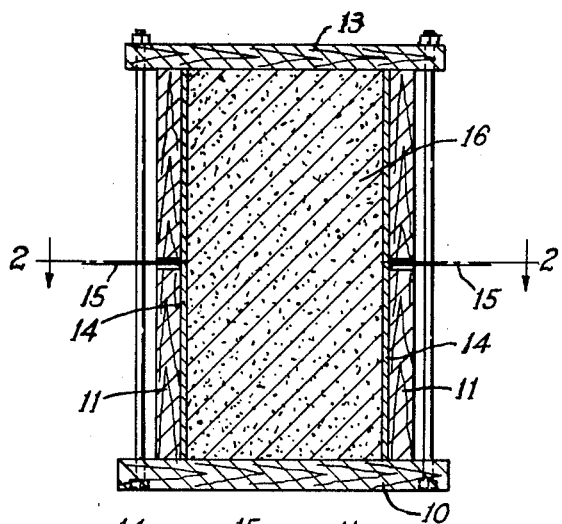

Sept. 5, 1950  W. S. RAMSAY  2,521,128
CASTING OF CERAMIC ARTICLES

Filed May 29, 1948  2 Sheets-Sheet 1

INVENTOR.
William S. Ramsay
BY
*Freese & Bishop*
ATTORNEYS

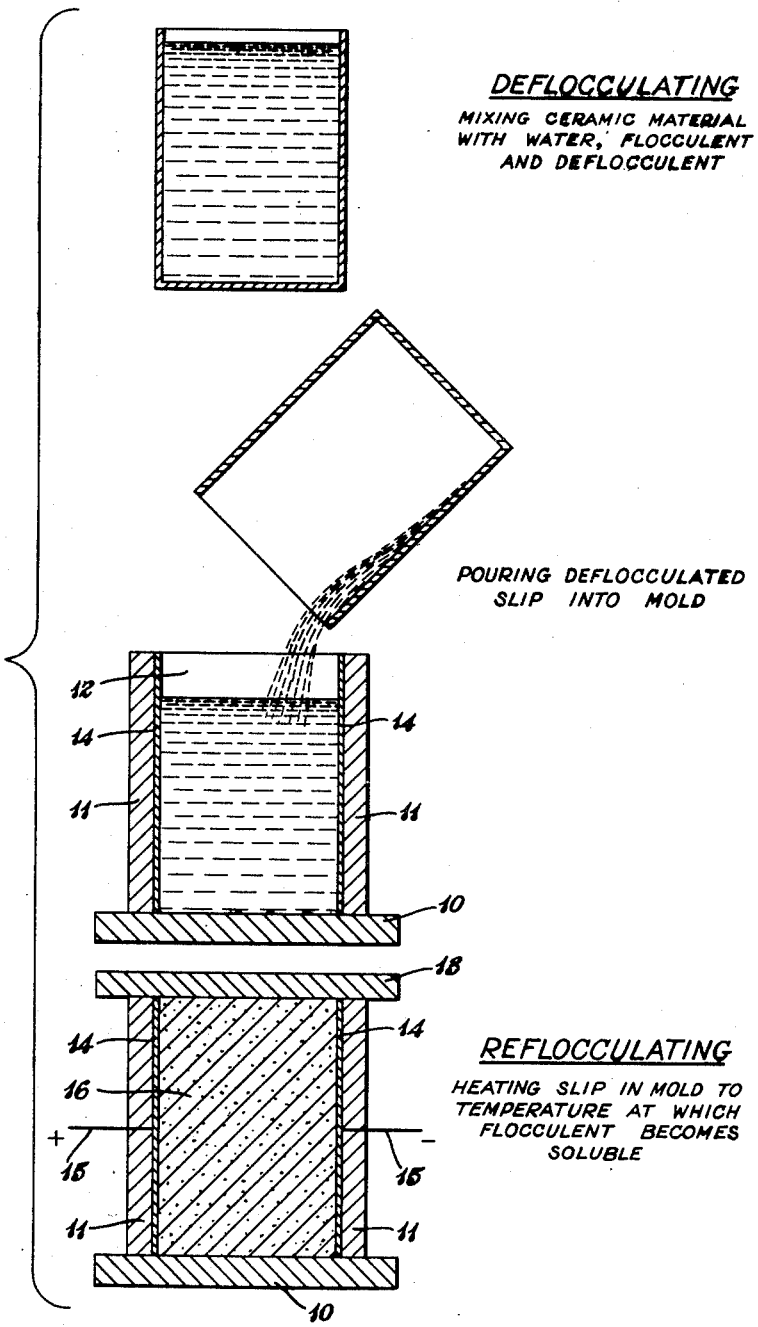

Patented Sept. 5, 1950

2,521,128

UNITED STATES PATENT OFFICE 2,521,128

CASTING OF CERAMIC ARTICLES

William S. Ramsay, Canton, Ohio, assignor to The Stark Brick Company, Canton, Ohio, a corporation of Ohio Application May 29, 1948, Serial No. 29,975

23 Claims. (Cl. 25—156)

The invention relates to the casting of ceramic articles and more particularly to a method by which slip is poured into a mold and the molded article is sufficiently hardened to be removed from the mold almost immediately.

It is an object of the invention to provide a method of rapidly casting ceramic articles of clay or any ceramic composition capable of being deflocculated.

Another object is to provide such a method for casting large ceramic or refractory objects, such as blocks for glass melting tanks, irregular refractory shapes, large terra cotta shapes, pottery, bricks, tiles and the like.

A further object is to provide a method of rapidly casting ceramic articles, which consists in mixing any clay or ceramic composition containing clay with sufficient water, depending upon the plasticity of the clay, to form a slip, together with small amounts of a flocculent which is insoluble in cold water and a deflocculent, pouring the slip into a mold and rapidly raising the temperature to the point at which the flocculent is soluble, whereupon the molded article immediately becomes sufficiently firm to permit its removal from the mold for drying and subsequent burning.

A still further object is to provide such a method in which the temperature may be rapidly raised to the desired point by passing an alternating current through the slip in the mold.

Another object is to provide for rapidly raising the temperature to the desired point by means of high frequency, dielectric heating.

A further object is to provide for casting ceramic articles in the manner above referred to, which includes adding to the slip a small amount of a deflocculent, such as fused sodium phosphate, sodium silicate or tri-sodium phosphate, and a small amount of a flocculent which is insoluble in water below about 135° F., such as completely hydrolyzed polyvinyl alcohol or phenylactic acid.

A still further object of the invention is to provide a method of casting ceramic articles which consists in mixing clay, together with feldspar, calcined clay, or other non-plastic material, with sufficient water to form a slip, adding small amounts of a flocculent insoluble in water at room temperature, and a deflocculent, pouring the slip into a mold and rapidly heating the slip to a temperature at which the flocculent becomes soluble.

Another object is to provide a method of casting ceramic articles which consists in mixing zirconium oxide or zirconium silicate, in granular or pulverized form, with water and adding small amounts of a flocculent insoluble in water at room temperature, and a deflocculent, pouring the mixture into a mold and rapidly heating it to a temperature at which the flocculent becomes soluble.

Figure 2:
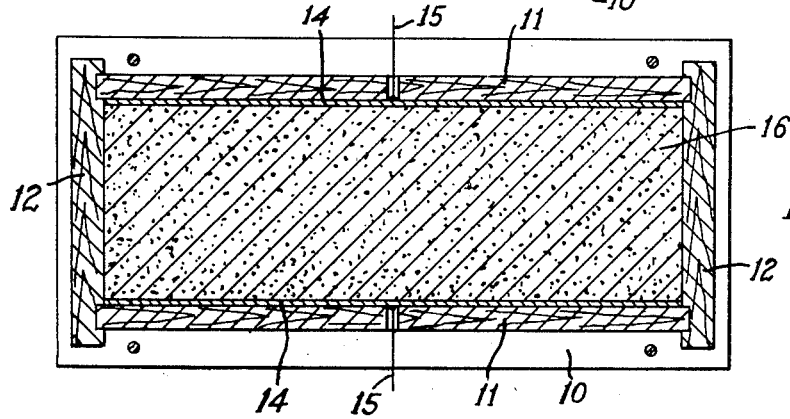
Figure 3:
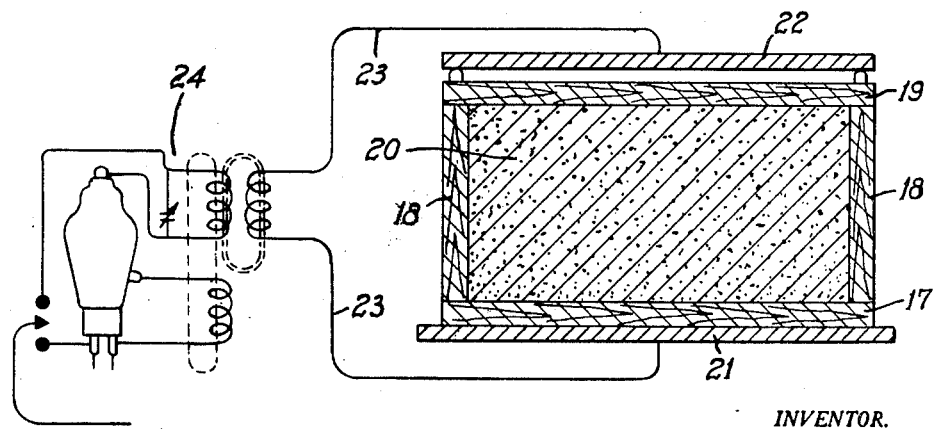

The above objects, together with others which will be apparent from the drawing and following description, or which may be later referred to, may be attained by carrying out the improved method of casting ceramic articles in the manner hereinafter described in detail, and by means of the apparatus illustrated in the accompanying drawing, in which:

Figure 1 is a transverse, sectional view through a mold for carrying out the improved method, showing the manner in which alternating current may be passed through the cast ceramic articles within the mold to rapidly bring the temperature thereof to the point where the flocculent becomes soluble;

Fig. 2 a plan sectional view through the mold shown in Fig. 1, taken as on the line 2—2, Fig. 1;

Fig. 3 a transverse sectional view through a mold for carrying out the improved method, showing means for heating the cast ceramic article within the mold by high-frequency, dielectric heating; and Fig. 4 a diagrammatic view in the nature of a flow sheet showing the steps of deflocculating, pouring the slip and reflocculating.

The improved method is especially adapted for the casting of large ceramic or refractory articles, such as large, irregular refractory shapes, blocks for glass melting tanks, large terra cotta shapes, pottery, bricks, tiles or other large articles formed of any ceramic composition capable of being deflocculated.

Under present practice, where such large articles are cast by pouring slip into a mold, it is necessary that the same remain in the mold for a considerable length of time, that is to say twenty-four hours or longer, depending upon the size of the article, before it has sufficiently hardened so that it may be removed from the mold to be dried and burned as in ordinary practice.

This necessitates the tying up of each mold for a considerable period of time in order to produce a single article, making it necessary to keep a large supply of molds on hand in order to produce articles on a commercial scale, resulting in a large expense for the molds required, as well as requiring considerable space for storing the molds.

The present invention contemplates a novel method of casting such large ceramic articles in such manner that the cast article may be removed from the mold a few seconds after it has been poured, thus providing considerable economy both in molds and space required therefor, making it possible to produce the finished, burned articles in much less time than is possible under present methods.

The invention may be carried out to cast ceramic articles from plastic clay, or from a powdered or granular ceramic material capable of being deflocculated, such as zirconium oxide or zirconium silicate, mixed with sufficient water to permit pouring into a mold, together with small amounts of a deflocculent and of a flocculent insoluble in water at room temperature.

Where a plastic material is used, clay or any desired ceramic composition containing clay, with or without any desired amounts of feldspar, calcined clay or other non-plastic material, may be mixed with sufficient cold water to produce a slip, usually 14% to 25% water being required, depending on the plasticity of the particular clay used in the composition.

To this ceramic composition is added a very small amount of a flocculent, which is insoluble in water at room temperature, and a very small amount of a deflocculent. This slip is then poured into a mold and is rapidly heated either by high-frequency or dielectric heating, or by means of an alternating current passed through the slip, bringing the entire body thereof quickly to the temperature at which the flocculent becomes soluble.

This causes the slip to jell or harden sufficiently so that the cast clay article may be immediately removed from the mold and may be dried and burned as in ordinary practice.

Since the time required for hardening the cast article sufficiently so that it may be removed from the mold is only a matter of a few seconds, it will be obvious that cast clay articles may be produced, on a commercial scale by this method, with the use of a comparatively small number of molds and requiring a comparatively small space.

As examples of a flocculent suitable for the purpose, completely hydrolyzed polyvinyl alcohol, or phenylactic acid, may be used, both of which are insoluble in water below a temperature of about 135° F.

The deflocculent used is preferably fused sodium phosphate although satisfactory results may be obtained by using sodium silicate or tri-sodium phosphate.

Any ceramic composition, as above referred to, may be mixed with sufficient water to produce a slip, it being understood that the water should be at a temperature considerably below 135° F., preferably at ordinary room temperature, or colder.

About one-tenth of 1% of either of the flocculents above mentioned, and a similar amount of either of the deflocculents, is mixed with the slip and the same is then poured into a mold, which may be of a construction such as shown in Figs. 1 and 2, comprising a bottom wall 10, side walls 11, end walls 12 and preferably a top wall 13.

The side walls 11 may be formed of conducting material or may have sheets of copper or other suitable conducting material 14 upon their inner surfaces, while all of the remaining walls of the mold are formed of non-conducting material.

Opposite sides of an alternating current circuit are connected to the conductors 14, as indicated at 15. When the slip, as indicated at 16, has been poured into the mold an alternating current is passed back and forth therethrough, between the conductors 14, which rapidly heats the entire mass of the slip to a temperature at which the flocculent becomes soluble.

It has been found that in about one and three-fourths to two minutes the temperature of the slip is raised to about 140° F., at which time the flocculent becomes soluble and reacts with the deflocculent causing the slip to immediately jell or thicken so that the cast article is sufficiently hard so that it may be immediately removed from the mold and dried and burned as in ordinary practice.

It has also been found that better results are obtained by using lower than a 60 cycle alternating current. In some cases as low as two cycles has been used with satisfactory results, although it is preferable to use about 20 to 25 cycles to give the best results.

Even quicker results may be obtained by using high-frequency dielectric heating, as shown in Fig. 3 in which the mold may comprise the bottom wall 17, side walls 18 and top wall 19. This mold is filled with slip, as indicated at 20, and electrodes are placed below and above the mold, as indicated at 21 and 22 respectively, these electrodes being connected by wires 23 to a suitable source of electric energy as indicated at 24.

In about ten seconds the entire body of the slip is heated to a temperature of about 140° F., at which time the flocculent becomes soluble and the cast article is hardened so that it may be removed from the mold and dried and burned.

The invention may also be carried out by using a powdered or granular ceramic material which is capable of being deflocculated, such as zirconium oxide or zirconium silicate. This ceramic material may be in any particle size from about 14 mesh down to a very fine powder, or may be a mixture of granular and powdered material.

Where the ceramic material is in powdered or granular form, such as zirconium oxide or zirconium silicate, the same is mixed with about 10% of cold water, to which is added about 1/10 of 1% of a suitable flocculent, such as completely hydrolyzed polyvinyl alcohol, or phenylactic acid, and a similar amount of a deflocculent, such as fused sodium phosphate, sodium silicate, or tri-sodium phosphate.

This mixture is then poured into a mold as shown in Figs. 1 and 2, and an alternating current is passed therethrough, as above described, or the mixture may be poured into a mold such as shown in Fig. 3, and subjected to high-frequency dielectric heating, as above described.

In either case, as soon as the temperature is raised to about 140° F., the flocculent becomes soluble and reacts with the deflocculent, causing the ceramic mixture to thicken, or jell so that the cast ceramic article is sufficiently hard and strong enough to be immediately removed from the mold and dried and burned as in ordinary practice.

I claim:

1. The method of casting ceramic articles which consists in mixing clay with sufficient cold water to form a slip, adding to the slip small amounts of a flocculent insoluble in cold water and of a deflocculent, pouring the slip into a mold and rapidly raising the temperature of the slip to the point where the flocculent becomes soluble, producing immediate reflocculation of the clay whereby the slip immediately hardens sufficiently so that the cast ceramic article may be immediately removed from the mold for burning.

2. The method of casting ceramic articles which consists in mixing clay with sufficient water to form a slip, adding to the slip small amounts of a flocculent insoluble in water at room temperature and of a deflocculent, pouring the slip into a mold and rapidly raising the temperature of the slip to the point where the flocculent becomes soluble, producing immediate reflocculation of the clay whereby the slip immediately hardens sufficiently so that the cast ceramic article may be immediately removed from the mold for burning.

3. The method of casting ceramic articles which consists in mixing clay with sufficient water to form a slip, adding to the slip small amounts of a flocculent insoluble in water below 135° F. and of a deflocculent, pouring the slip into a mold and rapidly raising the temperature of the slip above 135° F., producing immediate reflocculation of the clay whereby the slip immediately hardens sufficiently so that the cast ceramic article may be immediately removed from the mold for burning.

4. The method of casting ceramic articles which consists in mixing clay and non-plastic material with sufficient cold water to form a slip, adding to the slip small amounts of a flocculent insoluble in cold water and of a deflocculent, pouring the slip into a mold and rapidly raising the temperature of the slip to the point where the flocculent becomes soluble, producing immediate reflocculation of the clap whereby the slip immediately hardens sufficiently so that the cast ceramic article may be immediately removed from the mold for burning.

5. The method of casting ceramic articles which consists in mixing clay with sufficient cold water to form a slip, adding to the slip small amounts of a flocculent insoluble in cold water and of a deflocculent, pouring the slip into a mold and passing an alternating current through the slip in the mold to rapidly raise the temperature thereof to the point where the flocculent becomes soluble, producing immediate reflocculation of the clay whereby the slip immediately hardens sufficiently so that the cast ceramic article may be immediately removed from the mold for burning.

6. The method of casting ceramic articles which consists in mixing clay with sufficient cold water to form a slip, adding to the slip small amounts of a flocculent insoluble in cold water and of a deflocculent, pouring the slip into a mold and subjecting the slip to high-frequency dielectric heat to rapidly raise the temperature of the slip to the point where the flocculent becomes soluble, producing immediate reflocculation of the clay whereby the slip immediately hardens sufficiently so that the cast ceramic article may be immediately removed from the mold for burning.

7. The method of casting ceramic articles which consists in mixing clay with sufficient water to form a slip, adding to the slip small amounts of a flocculent insoluble in water below 135° F., and of a deflocculent, pouring the slip into a mold, and passing an alternating current through the slip from one and three-quarters to two minutes whereby the slip is raised to a temperature above 135° F. and is sufficiently hardened to permit removal from the mold, producing immediate reflocculation of the clay whereby the slip immediately hardens sufficiently so that the cast ceramic article may be immediately removed from the mold for burning.

8. The method of casting ceramic articles which consists in mixing clay with sufficient water to form a slip, adding to the slip small amounts of a flocculent insoluble in water below 135° F., and of a deflocculent, pouring the slip into a mold and subjecting the slip to high-frequency dielectric heat for about ten seconds whereby the slip is raised to a temperature above 135° F. and is sufficiently hardened to permit removal from the mold, producing immediate reflocculation of the clay whereby the slip immediately hardens sufficiently so that the cast ceramic article may be immediately removed from the mold for burning.

9. The method of casting ceramic articles which consists in mixing clay with sufficient water to form a slip, adding to the slip a small amount of completely hydrolized polyvinyl alcohol which is insoluble in water below 135° F. and a small amount of fused sodium phosphate, pouring the slip into a mold and rapidly raising the temperature of the slip above 135° F., producing immediate reflocculation of the clay whereby the slip immediately hardens sufficiently so that the cast ceramic article may be immediately removed from the mold for burning.

10. The method of casting ceramic articles which consists in mixing clay with sufficient water to form a slip, adding to the slip about $\frac{1}{10}$ of 1% of completely hydrolized polyvinyl alcohol which is insoluble in water below 135° F., and about $\frac{1}{10}$ of 1% of fused sodium phosphate, pouring the slip into a mold and rapidly raising the temperature of the slip above 135° F., producing immediate reflocculation of the clay whereby the slip immediately hardens sufficiently so that the cast ceramic article may be immediately removed from the mold for burning.

11. The method of casting ceramic articles which consists in mixing clay with sufficient water to form a slip, adding to the slip a small amount of phenylactic acid which is insoluble in water below 135° F., and a small amount of fused sodium phosphate, pouring the slip into a mold and rapidly raising the temperature of the slip above 135° F., producing immediate reflocculation of the clay whereby the slip immediately hardens sufficiently so that the cast ceramic article may be immediately removed from the mold for burning.

12. The method of casting ceramic articles which consists in mixing clay with sufficient water to form a slip, adding to the slip a small amount of completely hydrolized polyvinyl alcohol which is insoluble in water below 135° F., and a small amount of sodium silicate, pouring the slip into a mold and rapidly raising the temperature of the slip above 135° F., producing immediate reflocculation of the clay whereby the slip immediately hardens sufficiently so that the cast ceramic article may be immediately removed from the mold for burning.

13. The method of casting ceramic articles which consists in mixing clay with sufficient water to form a slip, adding to the slip a small amount of completely hydrolized polyvinyl alcohol which is insoluble in water below 135° F., and a small amount of tri-sodium phosphate, pouring the slip into a mold and rapidly raising the temperature of the slip above 135° F., producing immediate reflocculation of the clay whereby the slip immediately hardens sufficiently so that the cast ceramic article may be immediately removed from the mold for burning.

14. The method of casting ceramic articles which consists in mixing clay with sufficient water to form a slip, adding to the slip a small amount of completely hydrolized polyvinyl alcohol which is insoluble in water below 135° F., and a small amount of fused sodium phosphate, pouring the slip into a mold and subjecting the slip to high-frequency dielectric heat for about 10 seconds to raise the temperature of the slip above 135° F., producing immediate reflocculation of the clay whereby the slip immediately hardens sufficiently so that the cast ceramic article may be immediately removed from the mold for burning.

15. The method of casting ceramic articles which consists in mixing clay with sufficient water to form a slip, adding to the slip a small amount of completely hydrolized polyvinyl alcohol which is insoluble in water below 135° F., and a small amount of fused sodium phosphate, pouring the slip into a mold and passing an alternating current through the slip for about one and three-quarters to two minutes to raise the temperature of the slip above 135° F., producing immediate reflocculation of the clay whereby the slip immediately hardens sufficiently so that the cast ceramic article may be immediately removed from the mold for burning.

16. The method of casting ceramic articles which consists in mixing a ceramic material, capable of being deflocculated, with cold water, adding small amounts of a flocculent insoluble in cold water, and of a deflocculent, pouring the mixture into a mold, and rapidly raising the temperature of the mixture to the point where the flocculent becomes soluble, producing immediate reflocculation of the clay whereby the slip immediately hardens sufficiently so that the cast ceramic article may be immediately removed from the mold for burning.

17. The method of casting ceramic articles which consists in mixing a ceramic material, capable of being deflocculated, with cold water, adding small amounts of a flocculent insoluble in water below 135° F., and of a deflocculent, pouring the mixture into a mold, and rapidly raising the temperature of the mixture above 135° F., producing immediate reflocculation of the clay whereby the slip immediately hardens sufficiently so that the cast ceramic article may be immediately removed from the mold for burning.

18. The method of casting ceramic articles which consists in mixing a ceramic material, taken from a group comprising zirconium oxide and zirconium silicate, with water, adding small amounts of a flocculent insoluble in cold water, and of a deflocculent, pouring the mixture into a mold and rapidly raising the temperature of the mixture to the point where the flocculent becomes soluble, producing immediate reflocculation of the clay whereby the slip immediately hardens sufficiently so that the cast ceramic article may be immediately removed from the mold for burning.

19. The method of casting ceramic articles which consists in mixing a ceramic material, taken from a group comprising zirconium oxide and zirconium silicate, with water, adding small amounts of a flocculent insoluble in cold water, and of a deflocculent, pouring the mixture into a mold and passing an alternating current through the mixture and rapidly raising the temperature of the mixture to the point where the flocculent becomes soluble, producing immediate reflocculation of the clay whereby the slip immediately hardens sufficiently so that the cast ceramic article may be immediately removed from the mold for burning.

20. The method of casting ceramic articles which consists in mixing a ceramic material, taken from a group comprising zirconium oxide and zirconium silicate, with water, adding small amounts of a flocculent insoluble in cold water, and of a deflocculent, pouring the mixture into a mold, subjecting the mixture to high-frequency dielectric heat and rapidly raising the temperature of the mixture to the point where the flocculent becomes soluble, producing immediate reflocculation of the clap whereby the slip immediately hardens sufficiently so that the cast ceramic article may be immediately removed from the mold for burning.

21. The method of casting ceramic articles which consists in mixing ceramic material with sufficient water to form a slip, adding to the slip a small amount of a flocculent insoluble below about 135° F., and a small amount of a deflocculent taken from a group comprising sodium phosphate, tri-sodium phosphate and sodium silicate, pouring the slip into a mold and rapidly raising the temperature of the slip above 135° F., producing immediate reflocculation of the ceramic material whereby the slip immediately hardens sufficiently so that the cast ceramic article may be immediately removed from the mold for burning.

22. The method of casting ceramic articles which consists in mixing ceramic material with sufficient water to form a slip, adding to the slip a small amount of a flocculent taken from a group comprising completely hydrolized polyvinyl alcohol and phenylactic acid, which are insoluble below about 135° F., and a small amount of a deflocculent taken from a group comprising sodium phosphate, tri-sodium phosphate and sodium silicate, pouring the slip into a mold and rapidly raising the temperature of the slip above 135° F., producing immediate reflocculation of the ceramic material whereby the slip immediately hardens sufficiently so that the cast ceramic article may be immediately removed from the mold for burning.

23. The method of casting ceramic articles which consists in mixing ceramic material with sufficient water to form a slip, adding to the slip a small amount of a flocculent taken from a group comprising completely hydrolized polyvinyl alcohol and phenylactic acid, which are insoluble below about 135° F., and a small amount of a deflocculent, pouring the slip into a mold and rapidly raising the temperature of the slip above 135° F., producing immediate reflocculation of the ceramic material whereby the slip immediately hardens sufficiently so that the cast ceramic article may be immediately removed from the mold for burning.

WILLIAM S. RAMSAY.

REFERENCES CITED

The following references are of record in the file of this patent:

UNITED STATES PATENTS

| Number | Name | Date |
| --- | --- | --- |
| 1,925,058 | Rowland et al. | Aug. 29, 1933 |
| 2,293,099 | Barnes | Aug. 18, 1942 |
| 2,325,652 | Bierwirth | Aug. 3, 1943 |
| 2,347,324 | Johnson | Apr. 25, 1944 |
| 2,423,915 | Wacker | July 15, 1947 |